Figure 1:
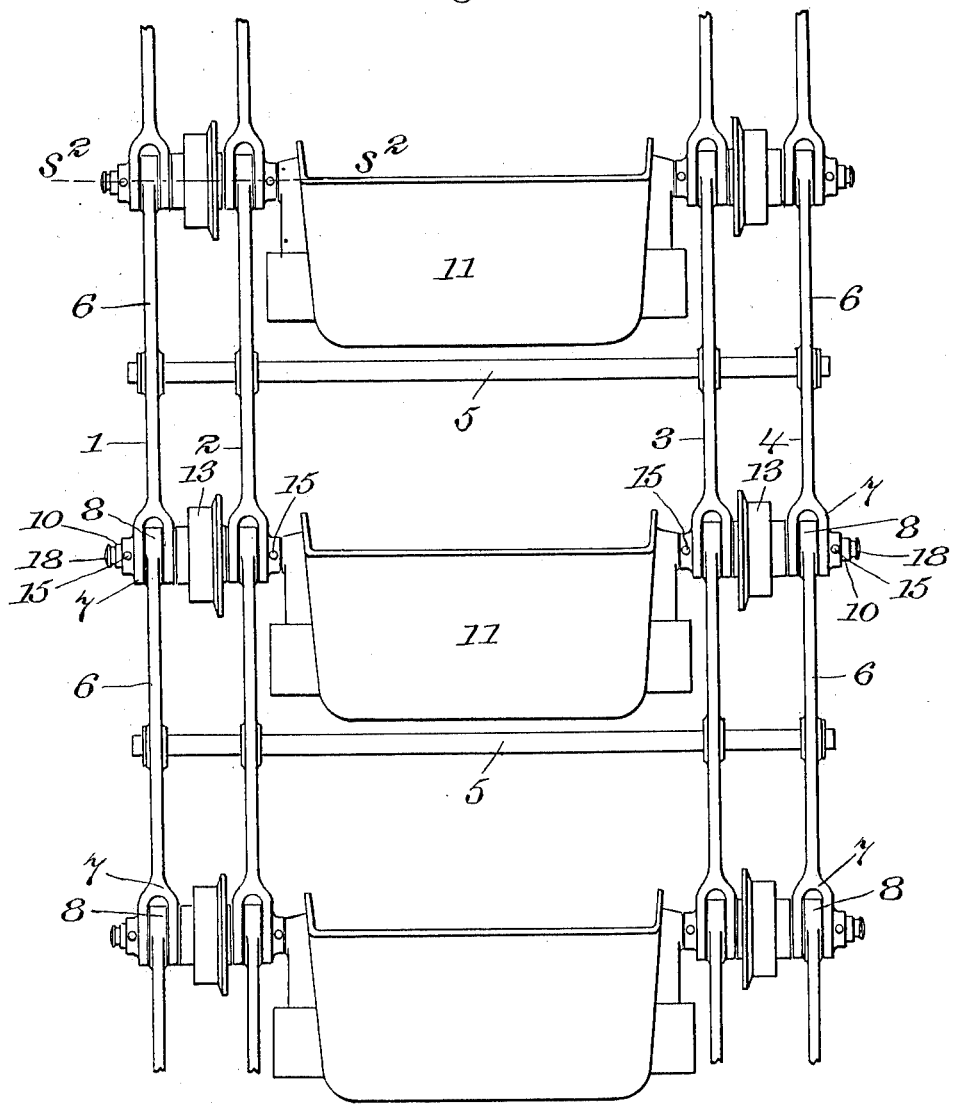

N. B. WIDMAYER.
LINK BELT CONVEYER.
APPLICATION FILED JAN. 19, 1911.

1,040,828.

Patented Oct. 8, 1912.
3 SHEETS—SHEET 1.

Witnesses:
M. G. Crawford
Noel Rothwell

Newton B. Widmayer
Inventor
By his Attorney Walter H. Pumphrey

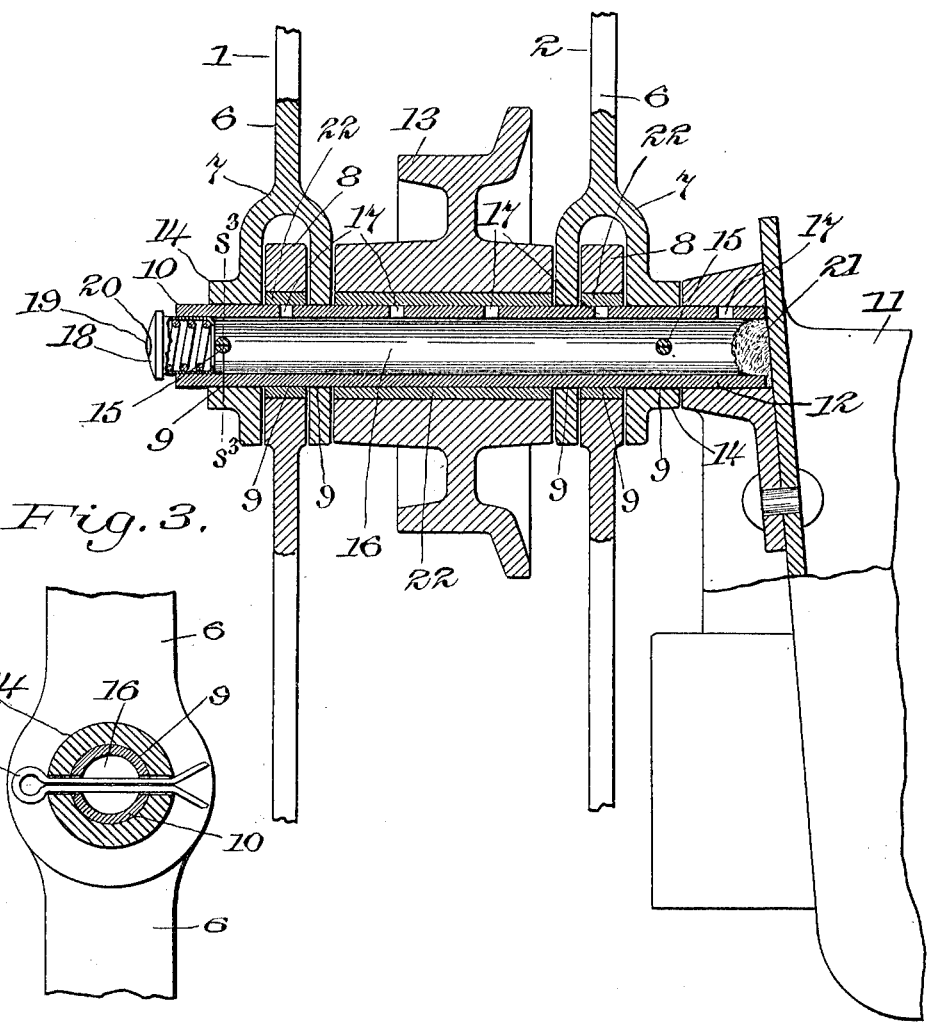

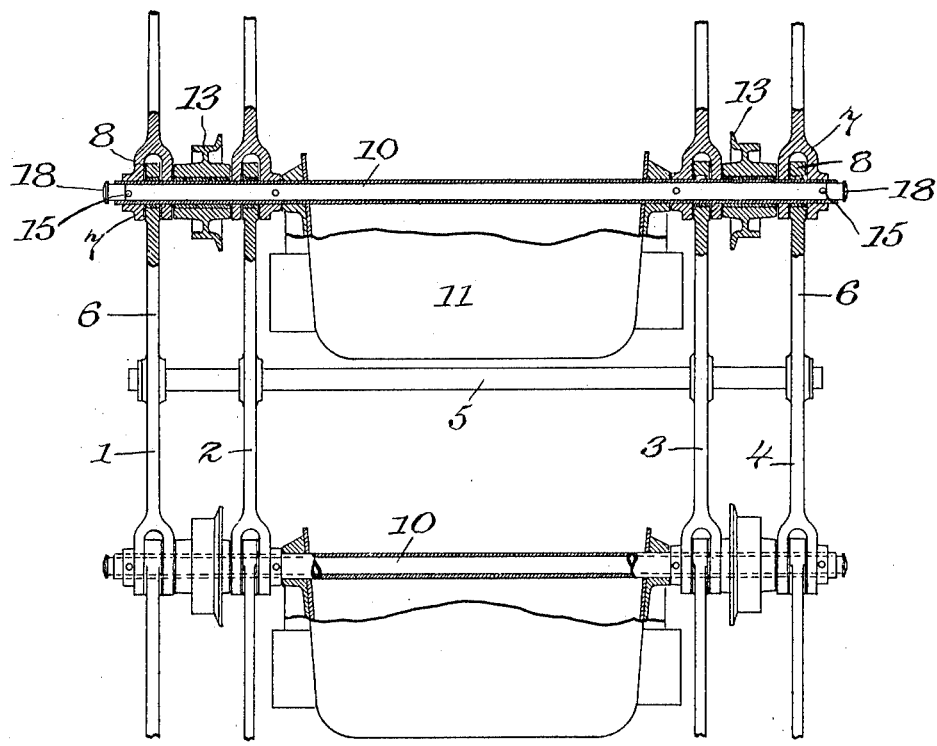

UNITED STATES PATENT OFFICE.

NEWTON BARTON WIDMAYER, OF YONKERS, NEW YORK.

LINK-BELT CONVEYER.

1,040,828.        Specification of Letters Patent.        Patented Oct. 8, 1912.

Application filed January 19, 1911. Serial No. 603,481.

*To all whom it may concern:*

Be it known that I, NEWTON BARTON WIDMAYER, a citizen of the United States of America, residing at Yonkers, in the county of Westchester and State of New York, have invented certain new and useful Improvements in Link-Belt Conveyers, of which the following is a specification.

My invention relates generally to link belt conveyers and while it is particularly adapted, as herein embodied, for use in conveyers of the gravity bucket type, it is not limited to the same.

The present invention is designed to provide for thorough lubrication of the bearings of link belt conveyers in a manner to effect a considerable saving in time, labor and expense, over the methods now commonly employed.

In carrying the invention into effect, provision is made first, for reducing the number of bearings in the conveyer to a minimum; second, for introducing the lubricant internally and causing it to work outward from a point within the bearings, rather than in the reverse direction, as when applied externally, as is ordinarily done; third, for storing the lubricant in quantity sufficient to supply a number of bearings and causing an automatic distribution of the same to such bearings during the operation of the conveyer.

The preferred embodiment of the invention is illustrated in the accompanying drawings. I wish it understood, however, that I do not limit myself to either the exact form or arrangement of parts shown, as various changes may be made therein without departing from the spirit and scope of the invention.

In the drawings: Figure 1 is a view in elevation of a portion of a link belt conveyer of the gravity bucket type, showing my invention applied. Fig. 2 is an enlarged detail section taken on the line $s^2$, $s^2$, of Fig. 1, and Fig. 3 is a similar view on the line $s^3$, $s^3$, of Fig. 2. Fig. 4 is a view partly in section, showing a modification.

Referring now to the drawings, 1, 2, 3 and 4 represent portions of endless chains of similar construction, which are arranged in parallel relation and connected one with another, throughout their length, by a series of through cross members 5, as shown.

The chains are formed of links 6, which are forked at one end only, as at 7, and as arranged, receive in the fork, the opposite end 8 of the adjoining link. In the overlapping extremities of the links, registering openings 9 are formed and fitted in such openings, there are members 10, which serve to pivotally connect the links together in pairs.

The members 10 are preferably given sufficient length to provide common pivots for the links of the outer and the adjoining inner chains in the present embodiment of the invention but, it will be apparent, that they could, if desired, be extended entirely across the conveyer, as the pivotal axes of the links are alined transversely thereof as shown in Fig. 4. Such a construction, while possible and practical, under certain conditions, is not desirable here, as it would interfere to some extent with loading the buckets 11, which are trunnioned on the inner projecting ends 12 of the members 10.

Between the outer and the adjoining inner chains of the conveyer, wheels 13 are mounted on the members 10 and serve to support the conveyer, being flanged and running on suitably arranged tracks (not shown) in the usual manner.

In order to reduce the number of bearings throughout the conveyer, the forked end of each link of the several chains is secured fast to the member 10, on which it is mounted. As shown, a boss 14 is formed on the fork and through registering openings of the boss and the member 10, a pin 15 is driven or otherwise entered and secured, thus uniting these parts against independent movement.

Provision is made for the storage of a quantity of lubricant and its distribution to the bearings of the several parts mounted on the members 10, by making such members hollow, as indicated at 16 and forming requisite passages 17 therein leading to the bearings. The inner ends of the members 10 being closed by the form of the trunnions, closures for the outer open ends thereof are provided in the form of hollow plugs 18, of well known construction, having a spring-closed valve 19 controlling an opening 20, through which oil or other lubricant may be introduced into the member 10. To check the flow of the lubricant through the trunnioned bearings, a wad of cotton waste, wicking or like material may be placed in the member 10, as indicated at 21.

The several parts having a bearing on the members 10, may be provided with a bushing 22, as shown.

The many important advantages of the invention will be apparent from the foregoing description and it will only be necessary therefore, to briefly mention them.

In reducing the number of bearings throughout the conveyer, by pinning one end of each link fast to its pivot, no wear can result between such parts and they do not require lubrication. Further in pinning the forked ends of the links of the outer and the adjoining inner chains to the same pivot, the opposite ends of the links straddled by the forks and the wheels interposed between them, are held assembled in proper relation and against lateral play and the resulting wear which such play would bring about. The arrangement of the links of two chains, the wheel and the trunnion bearing of the bucket to turn about the same pivotal axis, makes it possible to employ a single pivot i. e., the member 10, to carry these parts. Further, as a result of such an arrangement, a quantity of lubricant stored in the hollow pivot, serves to supply the bearings of the various parts mounted thereon for a considerable period of time and when it is necessary to renew the lubricant, the comparatively large quantity, stored in each hollow pivot, greatly reduces the time and labor involved over the old method of oiling each bearing individually.

Having, therefore, described my invention, I claim:

1. In a link belt conveyer, the combination of a series of buckets, chains arranged in parallel relation on each side of the buckets, wheels supporting the chains, through cross members between the buckets connecting the links of the several chains at points intermediate their ends, hollow axles for the wheels pivotally uniting the links of the chains and having projecting portions on which the buckets are trunnioned, said axles being provided with oil passages leading to the bearings of the members mounted thereon.

2. In a link belt conveyer, the combination of a series of buckets, chains arranged in parallel relation on each side of the buckets, wheels supporting the chains, through cross members between the buckets rigidly connecting the several chains, tubular members having the chain links, chain-supporting wheels and buckets mounted thereon and provided with oil passages leading to the bearings thereof, means securing the corresponding end of each of the chain links fast to the tubular members, and removable closures for the open ends of said tubular members.

3. In a link belt conveyer, the combination of two or more chains formed of forked links having overlapping ends provided with registering apertures, through cross members rigidly connecting the links, chain-supporting wheels and conveyer buckets arranged to turn about axes coinciding with the pivotal centers of the chain links, hollow oil-holding axles connecting the chain links, wheels and buckets operatively assembled, said axles being provided with passages leading to the bearings of the members mounted thereon, and means securing the forked end of the chain links fast to the axles.

NEWTON BARTON WIDMAYER.

Witnesses:
 WALTER H. PUMPHREY,
 M. G. CRAWFORD.

Copies of this patent may be obtained for five cents each, by addressing the "Commissioner of Patents, Washington, D. C."